(12) United States Patent
Okazawa (10) Patent No.: US 9,137,021 B2
(45) Date of Patent: Sep. 15, 2015

(54) IMAGE FORMING APPARATUS, SECURE NETWORK SYSTEM, METHOD FOR CONTROLLING IMAGE FORMING APPARATUS, AND METHOD FOR UPDATING CERTIFICATE INFORMATION

(75) Inventor: Takashi Okazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 13/570,186

(22) Filed: Aug. 8, 2012

(65) Prior Publication Data

US 2013/0057895 A1    Mar. 7, 2013

(30) Foreign Application Priority Data

Sep. 7, 2011    (JP) .................................. 2011-195348

(51) Int. Cl.
| | |
|---|---|
| *G06F 3/12* | (2006.01) |
| *H04L 9/32* | (2006.01) |
| *G06F 21/33* | (2013.01) |
| *G06F 21/44* | (2013.01) |
| *G06F 21/84* | (2013.01) |
| *H04L 29/06* | (2006.01) |

(52) U.S. Cl.
CPC .............. *H04L 9/3263* (2013.01); *G06F 21/33* (2013.01); *G06F 21/44* (2013.01); *G06F 21/84* (2013.01); *H04L 63/0823* (2013.01); *H04L 63/166* (2013.01); *H04L 63/20* (2013.01)

(58) Field of Classification Search
USPC .................. 358/1.15, 1.14; 726/2, 3, 4, 5, 10; 713/155, 156, 158
See application file for complete search history.

(56) References Cited

U.S. PATENT DOCUMENTS

| | | | |
|---|---|---|---|
| 6,459,496 B1 | 10/2002 | Okazawa | |
| 6,785,012 B2 | 8/2004 | Okazawa | |
| 2007/0005965 A1* | 1/2007 | Nalliah et al. | ................. 713/168 |
| 2007/0005981 A1* | 1/2007 | Miyazawa | ..................... 713/176 |
| 2008/0043278 A1* | 2/2008 | Suzuki | ......................... 358/1.15 |

FOREIGN PATENT DOCUMENTS

JP    2007-334753 A    12/2007

\* cited by examiner

*Primary Examiner* — Jamares Q Washington
(74) *Attorney, Agent, or Firm* — Fitzpatrick, Cella, Harper & Scinto

(57) ABSTRACT

An image forming apparatus registers, when certificate information has been updated, the updated certificate information in an authentication server, and after the registration has been finished, transmits an event notification indicating that the certificate information has been updated to a printer server. The printer server re-acquires cached certificate information in response to this notification, and then again caches the certificate information.

5 Claims, 11 Drawing Sheets

| ATTRIBUTE | VALUE |
|---|---|
| VERSION | 3 |
| SERIAL NUMBER | AB87D7 |
| SIGNATURE ALGORITHM | RSA-SHA1 |
| ISSUER | AAA co |
| VALIDITY PERIOD | 2011/9/19 |
| SUBJECT | Japan Tokyo |
| CN | 172.24.1.5 |
| FRIENDLY NAME | printer1 |

IMAGE FORMING APPARATUS, SECURE NETWORK SYSTEM, METHOD FOR CONTROLLING IMAGE FORMING APPARATUS, AND METHOD FOR UPDATING CERTIFICATE INFORMATION

BACKGROUND OF THE INVENTION

1. Field of the Invention

The present invention relates to a network system that allows an image forming apparatus to perform secure printing via a network, and particularly relates to an image forming apparatus, a secure network system, a method for controlling the image forming apparatus, and a method for updating certificate information.

2. Description of the Related Art

Conventionally, a technology named WSD (Web Services on Devices) has been proposed by Microsoft Corporation to connect an image forming apparatus having an image forming function, such as a printer or a multi-function copier with a network, and to print via the network with a client PC connected to the network. In WSD, a secure WSD specification is defined so that communication can be performed securely. In secure WSD, TLS (Transport Layer Security), which is defined by RFC2246, is used. In TLS, although prevention of spoofing is realized by performing certificate verification in which a client verifies server validity in addition to encryption, an operation is performed in which the encryption can only be performed by storing a self-singed certificate on a server. In this case, a risk of spoofing occurs since the client cannot verify the server validity. To address the risk of spoofing, Japanese Patent Laid-Open No. 2007-334753 (Patent Document 1) proposes the use of proxy authentication. In Patent Document 1, an authentication server is provided on a network, and a client device on the network performing communication performs logging in to the network and controls the login. Then, the client device performs control of a network system such that connected devices can exchange authentication information (certificate information) with each other on the network. Accordingly, in TLS, prevention of spoofing has been tried only with use of a self signature.

For example, in TLS or the like, it is necessary to register, in advance, the certificate information (authentication information) on a server in order for an authentication server to perform authentication for a request of the authentication. Also, security of the network system can be improved by regularly updating the certification information, for example.

However, if a cache mechanism is used in order to suppress network traffic, there is the risk that authentication fails since coordination is not achieved between certificate information that has been cached and certificate information on the authentication server.

SUMMARY OF THE INVENTION

The present invention was made in consideration of the conventional example described above, and an object of the present invention is to solve the above-described problems. More specifically, the present invention provides an image forming apparatus and a printing system in which failure in authentication processing, which arises from the update of certificate information on an authentication server, can be prevented.

According to one aspect of the present invention, the present invention may include the following configurations.

An image forming apparatus configured to be connected to an authentication server and a printer server, to transmit certificate information to and register certificate information in the authentication server, and to transmit the certificate information to the printer server in response to a request from the printer server, the image forming apparatus being authenticated by the printer server comparing certificate information of the image forming apparatus that is acquired from the authentication server with certificate information of the image forming apparatus that is acquired from the image forming apparatus, wherein, when the certificate information has been updated, a notification that the certificate information has been updated and sent to the printer server after a registration of the updated certificate information in the authentication server has been finished.

According to another aspect of the present invention, the present invention may include the following configurations.

A secure network system configured by connecting the image forming apparatus, a printer server, and an authentication server, wherein the authentication server registers the certificate information acquired from the image forming apparatus in a storage, and in response to a request, transmits the registered certificate information to a device that has requested the certification information, the printer server authenticates the image forming apparatus by comparing certificate information of the image forming apparatus that is acquired from the authentication server with certificate information of the image forming apparatus that is acquired from the image forming apparatus, when the certificate information has been updated, the image forming apparatus sends a notification that the certificate information has been updated to the printer server after a registration of the updated certificate information in the authentication server has been finished, and the printer server further caches the acquired certificate information, and upon receiving a notification that the certificate information has been updated, acquires the certificate information from the authentication server and re-caches the acquired certificate information.

Alternatively, according to still another aspect of the present invention, the present invention may include the following configurations.

An image forming apparatus that is configured to be connected to an authentication server and a printer server, to transmit certificate information to and register the certificate information in the authentication server, and to transmit the certificate information to the printer server in response to a request from the printer server, wherein the image forming apparatus is authenticated by the printer server comparing certificate information of the image forming apparatus that is acquired from the authentication server with certificate information of the image forming apparatus that is acquired from the image forming apparatus, acquired certificate information from the authentication server is cached in the printer server, and the image forming apparatus comprises a registration unit for re-registering, when the certificate information has been updated, certificate information in the authentication server, and a notification unit for sending a notification causing the printer server to discard cached certificate information, in response to a notification that the registration of the certificate information acquired from the authentication server has been terminated.

According to the present invention, coordination of certificate information in printing systems can be maintained, and failure in authentication can be prevented.

Further features of the present invention will become apparent from the following description of exemplary embodiments (with reference to the attached drawings).

DESCRIPTION OF THE EMBODIMENTS

First Embodiment

Figure 1:
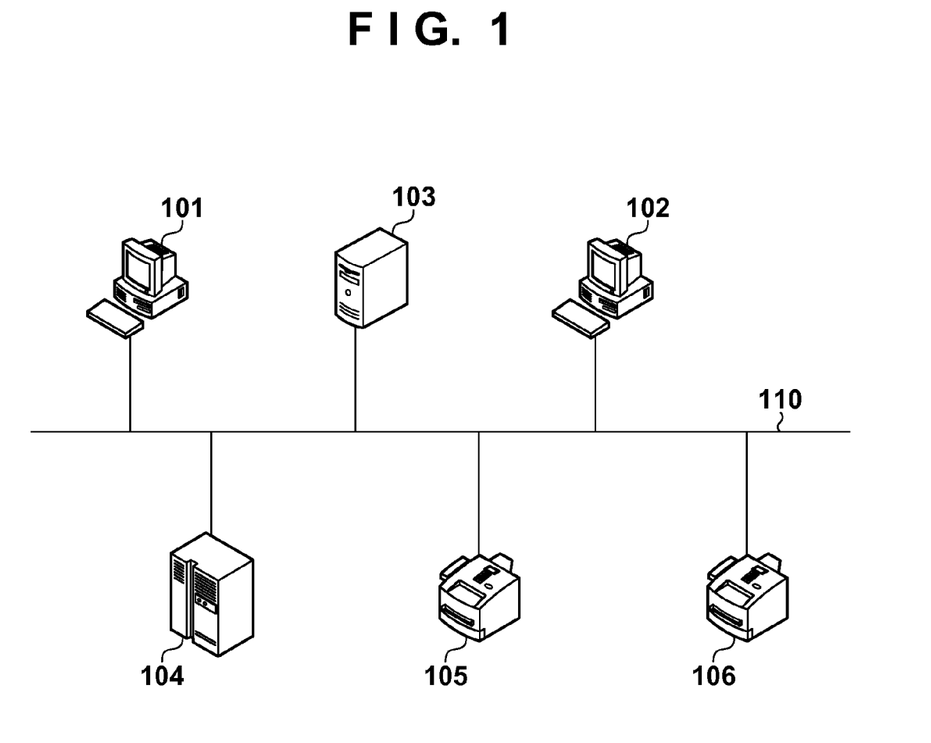
FIG. 1 is a diagram showing a network system configuration according to a conventional technology and the present invention.

Hereinafter, a secure network system for carrying out the present invention will be described using the drawings. In FIG. 1, clients 101 and 102, a printer server 103, an authentication server 104, and image forming apparatuses 105 and 106 are included in a network printing system and connected with a network 110. There may be more clients and image forming apparatuses than shown in FIG. 1. It should be noted that hereinafter, reference numeral 101 is used for the clients and reference numeral 105 is used for the image forming apparatuses. The printer server 103 and the authentication server 104 may be physically different computers as shown in FIG. 1, or functions of both servers may be provided in the same computer. The authentication server 104 manages connection to the network printing system in FIG. 1, and connection to the network environment, except for the authentication server 104, is possible only after successful authentication by the authentication server 104. The image forming apparatus 105 has a print function, such as the functionality of a multi-function copier that has a network printer or a network interface, and executes print jobs received from the network.

Each device has constituent elements of a computer. In other words, each device includes a control unit (processor) that executes a program and manipulates data, or performs IO control, a memory that stores data and programs, a hard disk or the like that serves as a non-volatile storage that stores files and the like, a network interface, and a human-machine interface. The image forming apparatus further has an image forming unit using an inkjet method or an electrophotographic method for making a hard copy of an image. Also, the image forming apparatus has a unit for storing certificate information. Although it is desirable that the certificate information is issued by an authority for issuing electronic certificates, in the present embodiment, for example, certificate information created by an administrator of the image forming apparatus 105 can be used. Moreover, the authentication server 104 can register the certificate information in association with each of the devices or users to be certified.

Example of Authentication Procedure

Figure 2:
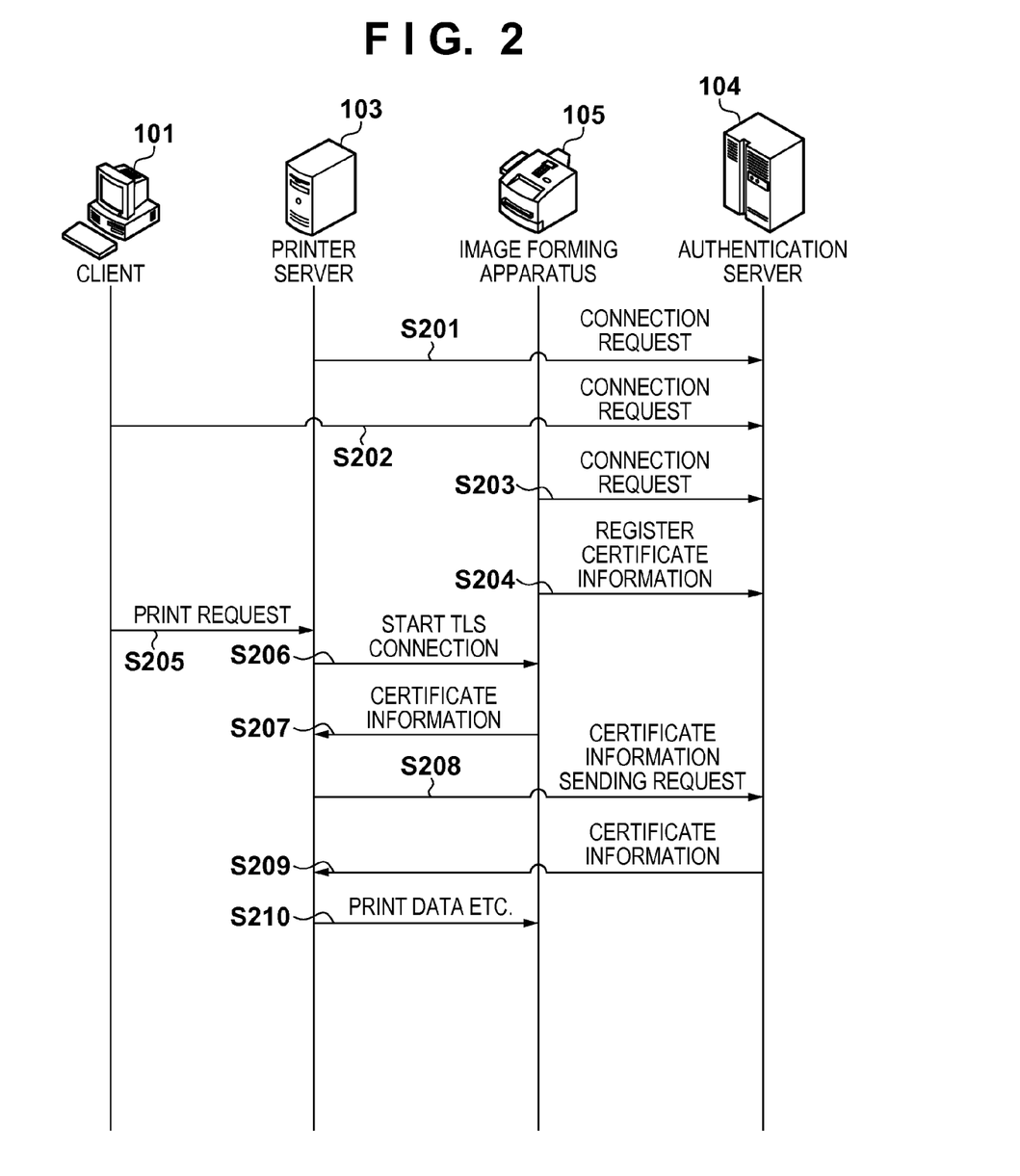
FIG. 2 is a flowchart of a network printing system according to the present invention.

FIG. 2 shows a flow for verifying the validity of a self-signed certificate in the printing system. In step S201, the printer server 103 uses a network authentication protocol, and requests the authentication server 104 to connect it to a network environment that is managed by the authentication server 104. If the authentication server 104 responds that connection is permitted, then, the printer server 103 can connect to the network environment. This procedure is omitted in FIG. 2. In step S202, the client 101 uses a similar authentication unit to connect to the network environment. In step S203, the image forming apparatus 105 uses a similar authentication unit to connect to the network environment.

Figure 7:
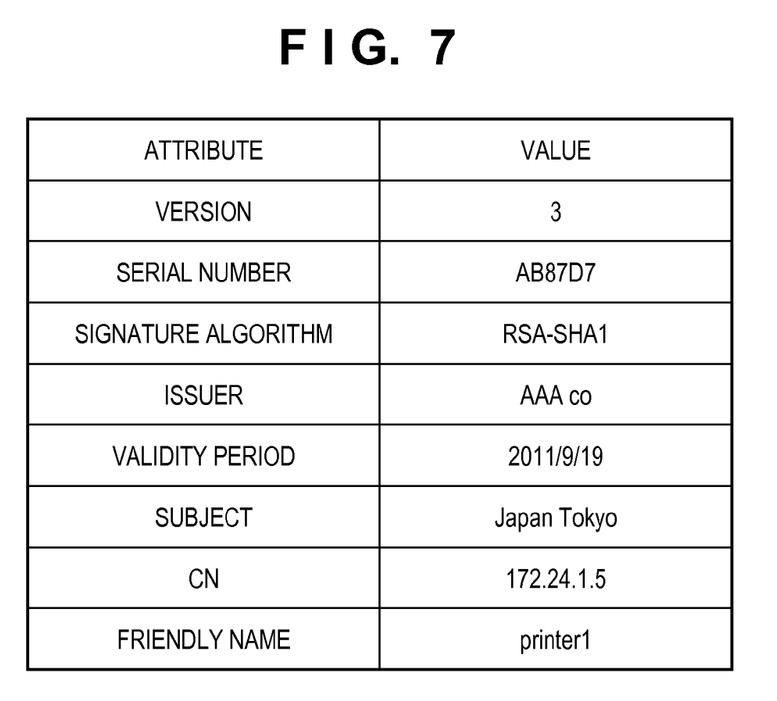
FIG. 7 is an example of attribute information of a certificate according to embodiments of the present invention and the conventional technology.

After connecting to the network environment, in step S204, the image forming apparatus 105 registers, at the authentication server 104, certificate information used in secure WSD. The certificate information includes the attribute information shown in FIG. 7. The values in the right column in FIG. 7 are examples of values of the attributes. Examples of the attributes may include attributes, such as an authority key identifier and a CRL distribution point, in addition to the attributes shown in FIG. 7. Since the amount of data increases if the data includes a lot of attribute information, an example of the certificate information may be such information as hash information of a certificate, which can uniquely specify the certificate. In the case where a user enters an instruction for executing printing into the client 101, the client 101 does not directly transmit a print request to the image forming apparatus 105, but transmits the print request to the printer server 103 in step S205. Although the communication protocol for the client 101 and the printer server 103 is not limited to WSD, upon receiving the print request from the client 101, the printer server 103 notifies the image forming apparatus 105 of the start of a TLS connection in step S206, for example. In step S207, the image forming apparatus 105 sends the self-signed certificate used in the TLS to the printer server 103. In step S208, the printer server 103 requests the authentication server 104 to send the certificate information that is registered by the image forming apparatus 105, as a process for verifying whether the received certificate is reliable. In step S209, if the requested certificate information is registered in the authentication server 104, the authentication server 104 responds with the certificate information. In other words, the authentication server 104 transmits the certificate information to a source of certificate information requests. In step S210, the printer server 103 compares the certificate information acquired from the image forming apparatus 105 with certificate information acquired from the authentication sever 104, and if they match, in other words, if authentication is successful, the printer server 103 determines that the image forming apparatus 105 can be trusted, continues communication processing, and in step S210 transmits print data or the like to the image forming apparatus 105 and lets the image forming apparatus 105 perform print processing. On the other hand, if the result of the authentication is unsuccessful, the printer server 103 interrupts the communication processing and discontinues the print processing. The present printing system can cope with sniffing or falsification by enciphering a communication channel using TLS, and deals with the risk of spoofing by verifying a certificate with use of an authentication server. It should be noted that "certificate verification" means authentication of a certificate issuing source. Although printing system processing is described in FIG. 2, the present invention can also be similarly applied to a flow in which the printer server 103 installs a printer in the image processing apparatus 105.

Hereinafter, the network printing system in FIG. 1 is described as a certificate verification system. In the present certificate verification system, the image forming apparatus 105 is provided with a function that registers certificate information in the authentication server 104 as well as a secure WSD function. In the present certificate verification system, the printer server 103 is provided with a function that transmits certificate information to the authentication server 104 and executes certificate verification processing after receiving a certificate from the image forming apparatus 105. In the present certificate verification system, the authentication server 104 is provided with a function that receives a registration of certificate information, holds the certificate information, and verifies the validity of the certificate upon request.

Connection Processing Procedure by Image Forming Apparatus

Figure 3:
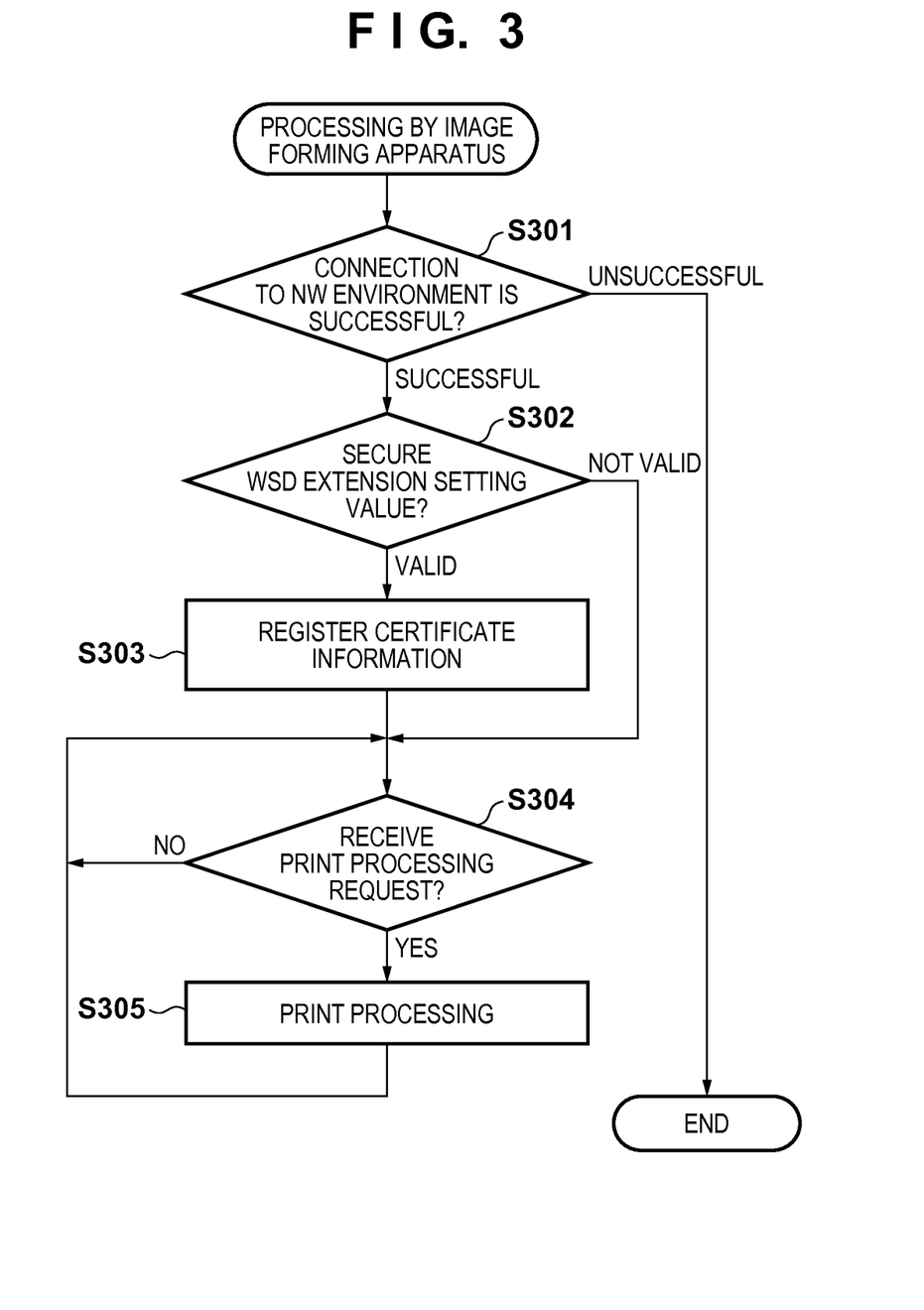
FIG. 3 is a flowchart of an image forming apparatus in the network printing system according to the present invention.

FIG. 3 is a flowchart showing an operation flow of the image forming apparatus 105 in FIG. 1 after its power is turned on. In step S301, the image forming apparatus 105 transmits a connection request to the authentication server 104 in order to connect to a network environment. If the authentication server 104 responds that connection is permitted, then, in step S302, the image forming apparatus 105 references a secure WSD extension setting value, in other words, a setting value indicating whether or not TLS setting and certificate information are registered in the authentication server 104. If the TLS setting is valid and the setting in which the certificate information is registered in the authentication server 104 is valid, then, in step S303, the certificate information used in the TLS is transmitted to the authentication server 104 and registered. If the TLS setting is not valid or if the setting indicating that the certificate information is not registered in the authentication server 104, then registration processing is not performed. Then, in steps S304 and S305, upon a reception of a print request, print processing is executed.

Connection Processing Procedure by Printer Server

Figure 4:
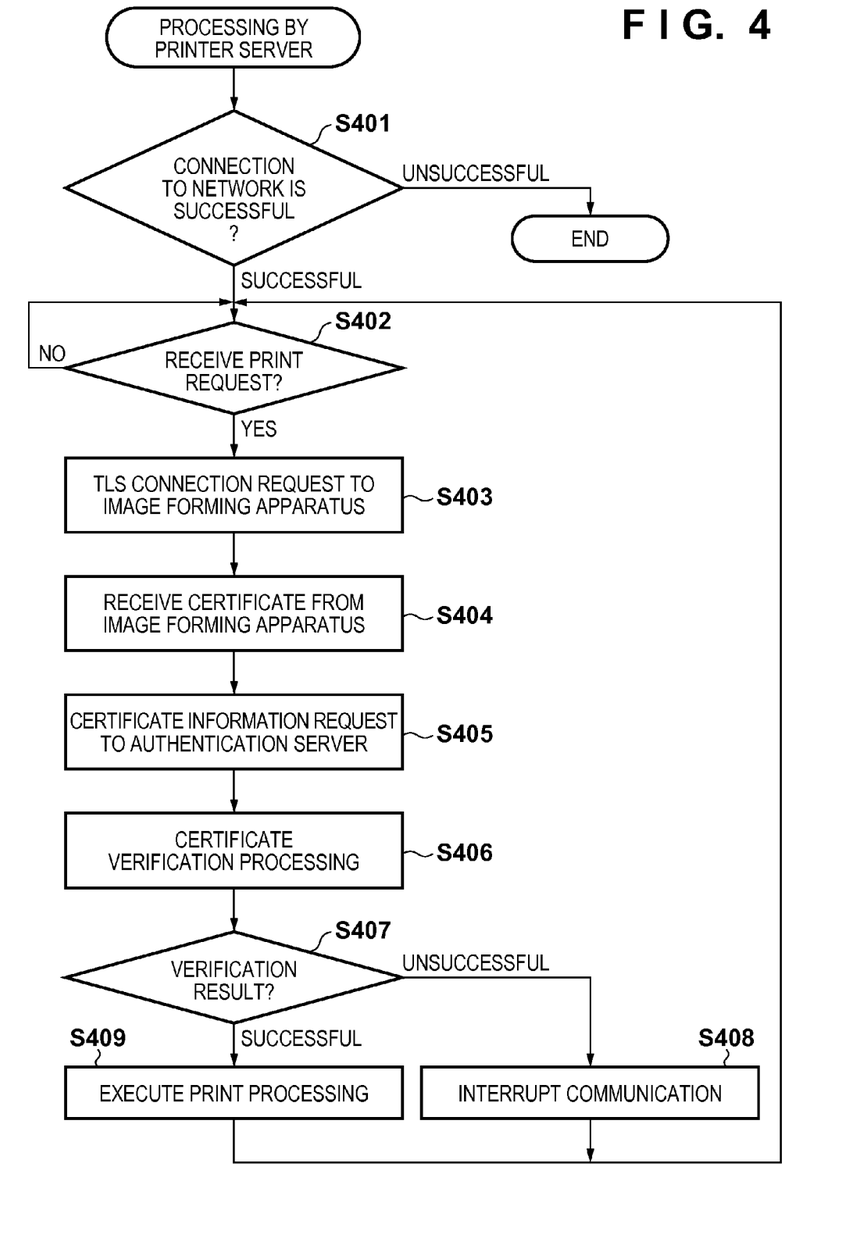
FIG. 4 is a flowchart of a printer server in the network printing system according to the present invention.

FIG. 4 is a flowchart showing an operation flow of the printer server 103 in FIG. 1 after its power is turned on. In step S401, the printer server 103 transmits a connection request to the authentication server 104 in order to connect to a network environment. If the authentication server 104 responds that connection is permitted, then, in step S402, the printer server 103 waits for the print request from the print client 101. Upon receiving the print request, in step S403, the printer server 103 transmits a TLS connection request to the specified image forming apparatus 105. During TLS negotiation, if receiving a certificate from the image forming apparatus 105 (step S404), the printer server 103 extracts certificate information from the certificate, and further requests certificate information of the authentication server 104 (step S405). The certificate information from the authentication server 104 is compared with a certificate from the image forming apparatus 105, and if they match, in other words, if verification (step S406) of the validity of the image forming apparatus 105 is successful, the TLS negotiation is finished and the print processing is continued (steps S407 and S409). If the verification of the validity of the image forming apparatus 105 is unsuccessful, the TLS negotiation is aborted and the print processing is interrupted (steps S407 and S408).

Authentication Processing Procedure by Authentication Server

Figure 5:
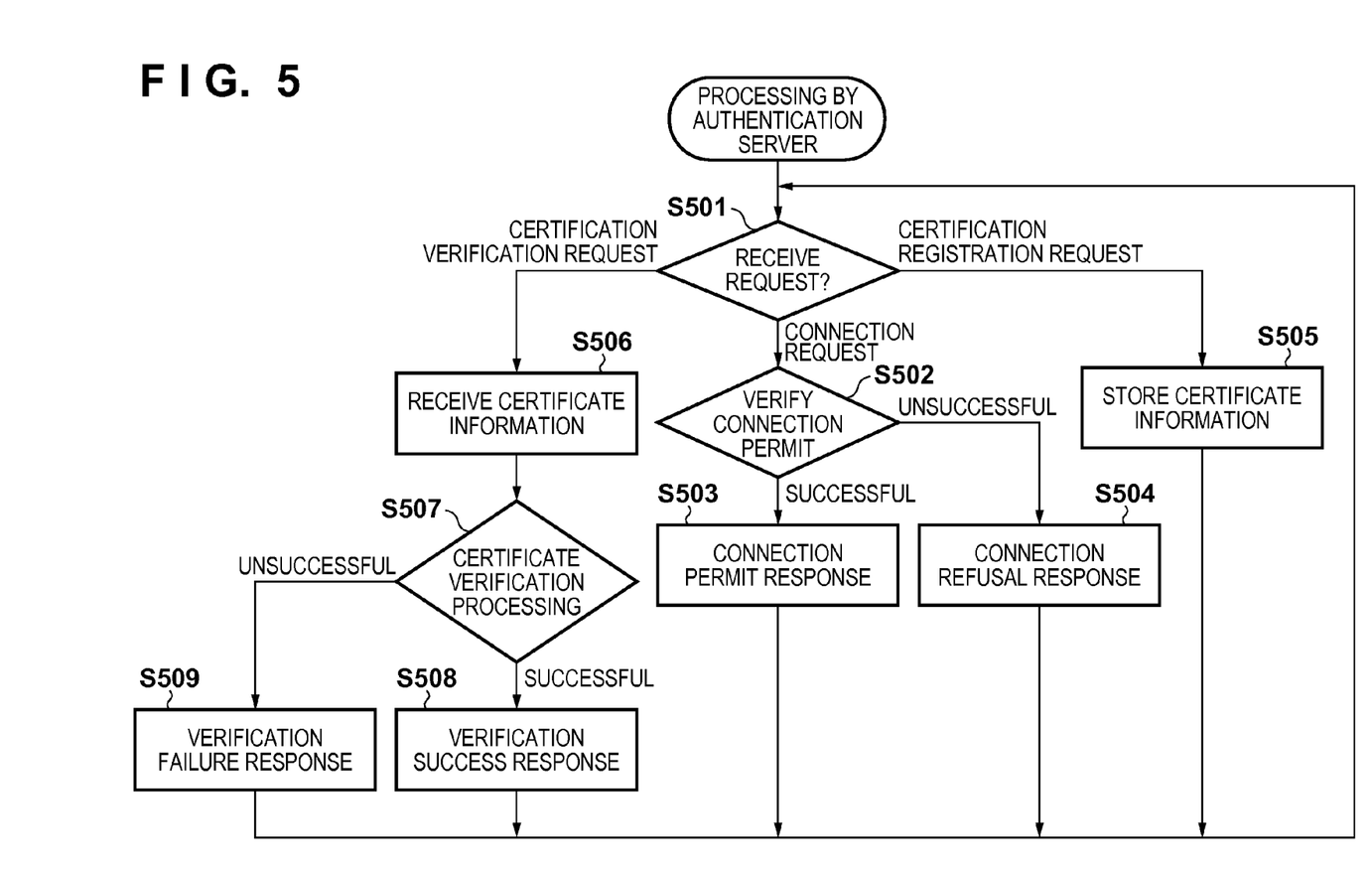
FIG. 5 is a flowchart of an authentication server in the network printing system according to the present invention.

FIG. 5 is a flowchart showing an operation flow of the authentication server 104 in FIG. 1 after its power is turned on. The authentication server 104 waits for a connection request from a network device such as a server, a client terminal, an image forming apparatus or the like, which tries to connect to a network environment managed by the authentication server 104 (step S501). If it receives a request for connecting to the network environment from a network device, the authentication server 104 references a connection permission standard that is set in the authentication server 104, and determines whether the connection is permitted (step S502). As the connection permission standard, a list of list files of terminals that are to be permitted to connect is defined may be stored in advance in the authentication server 104, or the determination may be performed with use of a network authentication protocol such as digest authentication or the like. If the connection is permitted, a response that the connection is permitted is transmitted (step S503), and access is controlled so that a terminal can connect to the network environment. If the response is that a connection is refused, then, a response that the connection is refused is transmitted (step S504), and the access is controlled so that the terminal cannot connect to the network environment. If a certificate registration request is received in step S501, then the authentication server 104 stores the received certificate information (step S505). If a certificate verification request is received in step S501, then the authentication server 104 receives the certificate information (step S506), and performs verification of the received certificate information and determines whether or not the verification was successful (step S507). If the verification was successful, the authentication server 104 transmits a response of success of the verification to a source that has requested the verification (step S508), and if the verification was unsuccessful, the authentication server 104 transmits a response of failure of the verification (step S509).

Connection Processing Procedure by Client

Figure 6:
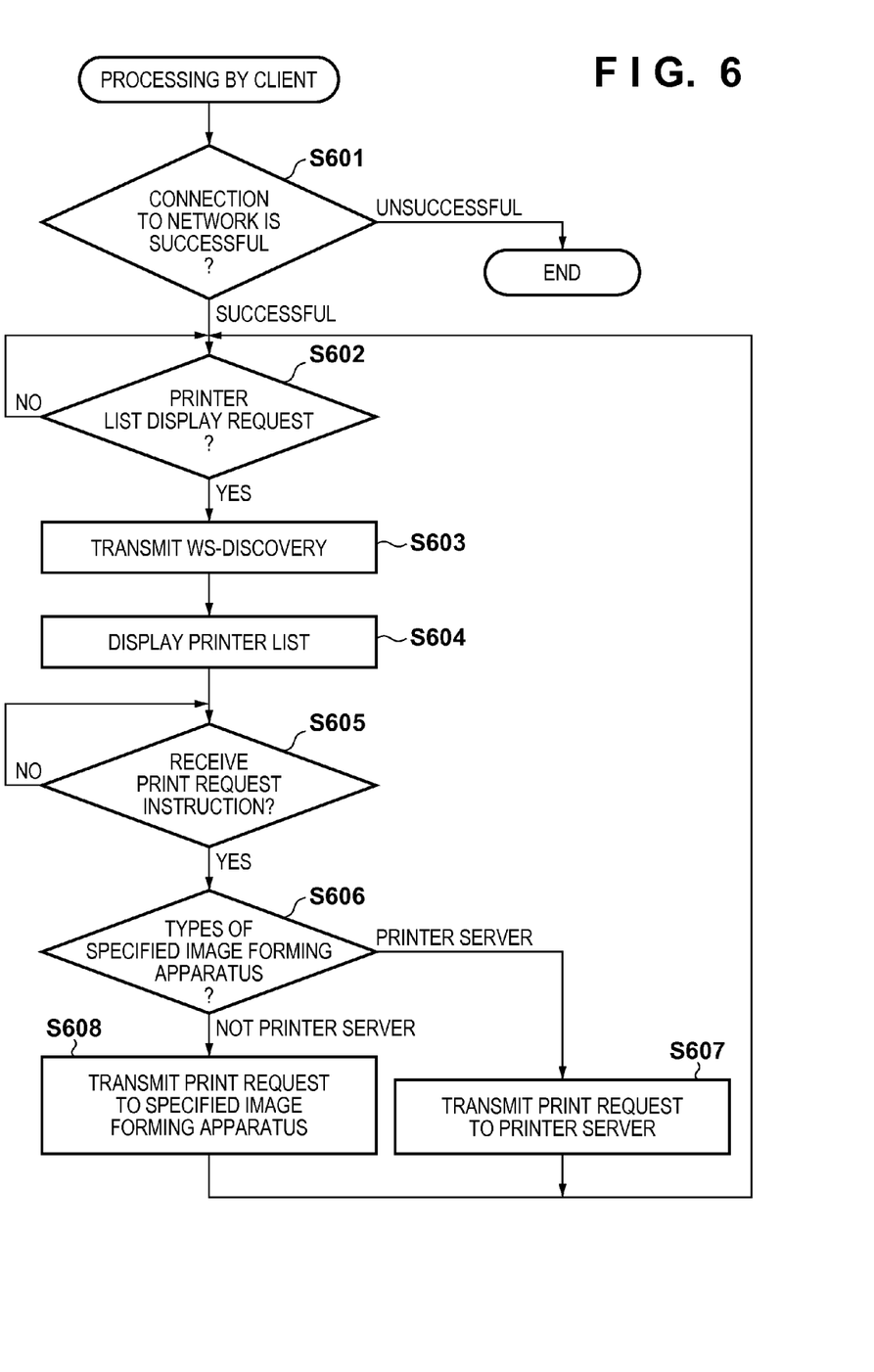
FIG. 6 is a flowchart of a print client in the network printing system according to the present invention.

FIG. 6 is a flowchart showing an operation flow of the client 101 in FIG. 1 after its power is turned on. In step S601, the client 101 transmits a connection request to the authentication server 104 in order to connect to a network environment. If the authentication server 104 responds that the connection is permitted, then the client 101 assumes a state in which it waits for a request from a user to display a list of printers (step S602). If the client is equipped with the WSD function, then, being requested to display a screen with the list of printers, the client 101 transmits a WS-Discovery search packet via multicast (step S603). Image forming apparatuses 105 and 106 that have responded to the WS-Discovery search and a printer server 103 that has been added in the list of printers in advance are displayed together as a list (step S604). If a user executes print processing, in other words, if the client 101 has received a print request (step S605), then, the client 101 determines whether the specified image forming apparatus is an image forming apparatus that has been found by the WS-Discovery search or a printer server (step S606). If the specified image forming apparatus is the image forming apparatus 105 or 106 found by the WS-Discovery search, print processing is executed via plain text WSD communication (step S608). If the specified image forming apparatus is the printer server, a request for the print processing is transmitted to the printer server 103 (step S607).

Processing for Updating Certificate Information

Figure 8:
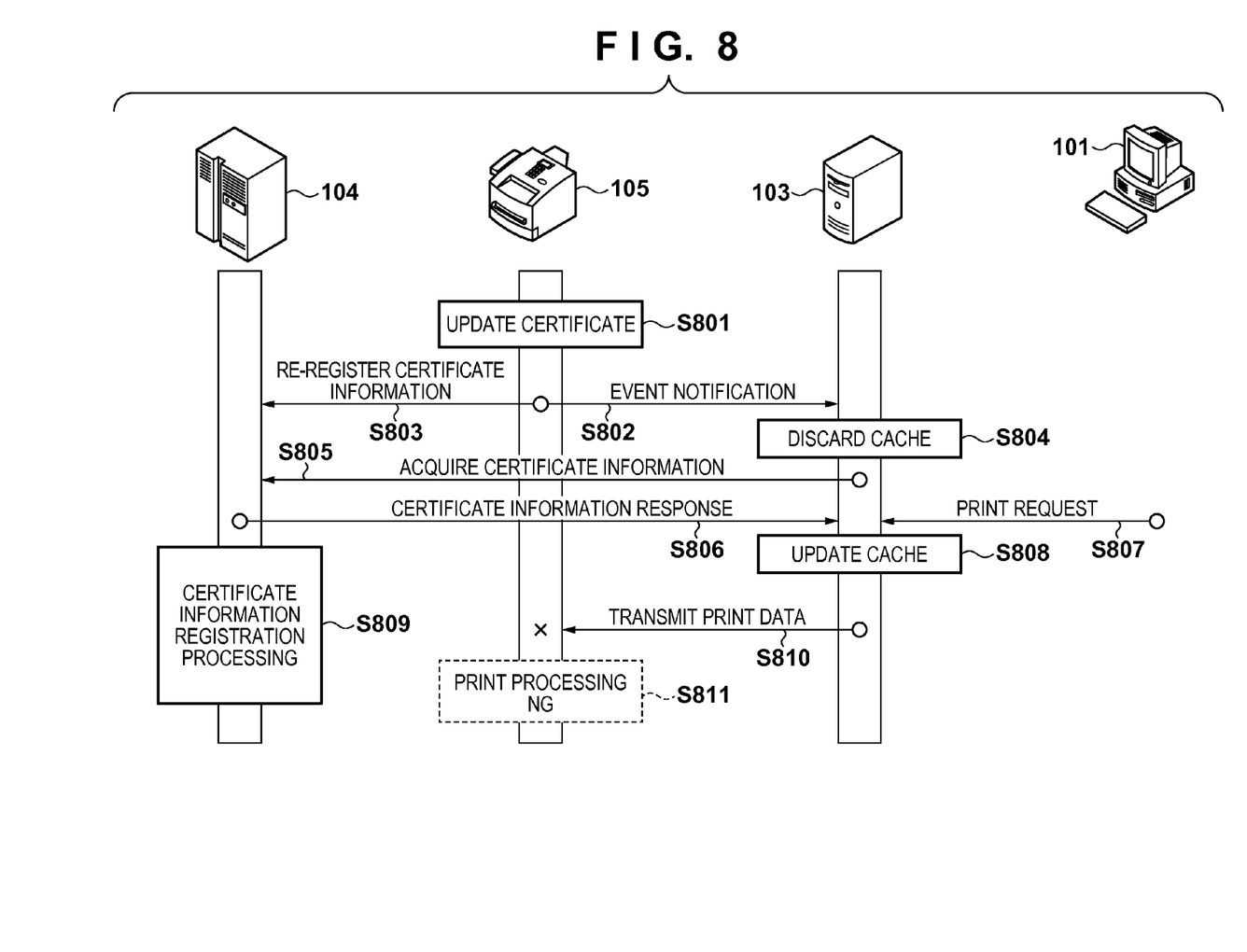
FIG. 8 is a flowchart of the network printing system according to the present invention.

In use of the above-described network system, the printer server 103 usually does not request the certificate information required for verification processing of the authentication server 104 every time the printer server 103 is requested to print. The printer server 103 temporarily holds the certificate information acquired from the authentication server 104 as cache information, and uses the cached authentication information in the verification processing. This control is performed for the purpose of reducing the amount of communication traffic. In an environment where such control is performed, if the certificate information changes, the image forming apparatus 105 needs to re-register certificate information with the authentication server 104. For this reason, a cache is updated with the procedure in FIG. 8 to synchronize the certificate information registered in the authentication server 104 with the authentication information cached in the printer server 103. FIG. 8 shows a sequence for the case where certificate information is updated based on the sequence in FIG. 2.

In FIG. 8, in the case where a certificate is updated (step S801), the image forming apparatus 105 registers certificate information in the authentication server 104 and sends an event notification to the printer server 103 substantially at the same time (steps S802 and S803). Upon receiving the event notification from the image forming apparatus 105, the printer server 103 discards the cached information (cached certificate information) in step S804, and in steps S805 and S806 performs acquisition of certificate information from the authentication server 104 in order to update the cached information. As a result, the cache in the printer server 103 is updated in step S808. Accordingly, if the acquisition of certificate information in step S806 is performed after the certificate information registered in the authentication server 104 is updated, the certificate information cached by the printer server 103 is updated as well. Therefore, authentication errors that are caused by acquiring cached certificate information that has not been updated can be prevented for any subsequent print requests.

Now, here, if the printer server 103 acquires certificate information from the authentication server 104 before the authentication server 104 re-registers (that is, updates) certificate information anew, the cached certificate information is certificate information that has not been updated. When receiving a request for print processing from the client 101 (step S807), if there is valid cache information at that time, the printer sever 103 uses this information and performs communication with a device using the valid cache information (step S810). Accordingly, in this case, authentication is performed with old certificate information, and as a result, the TLS communication fails in step S810 (there is no transmission at step S810), and thus the communication for printing cannot be performed (step S811).

Improved Sequence in FIG. 8

Figure 9:
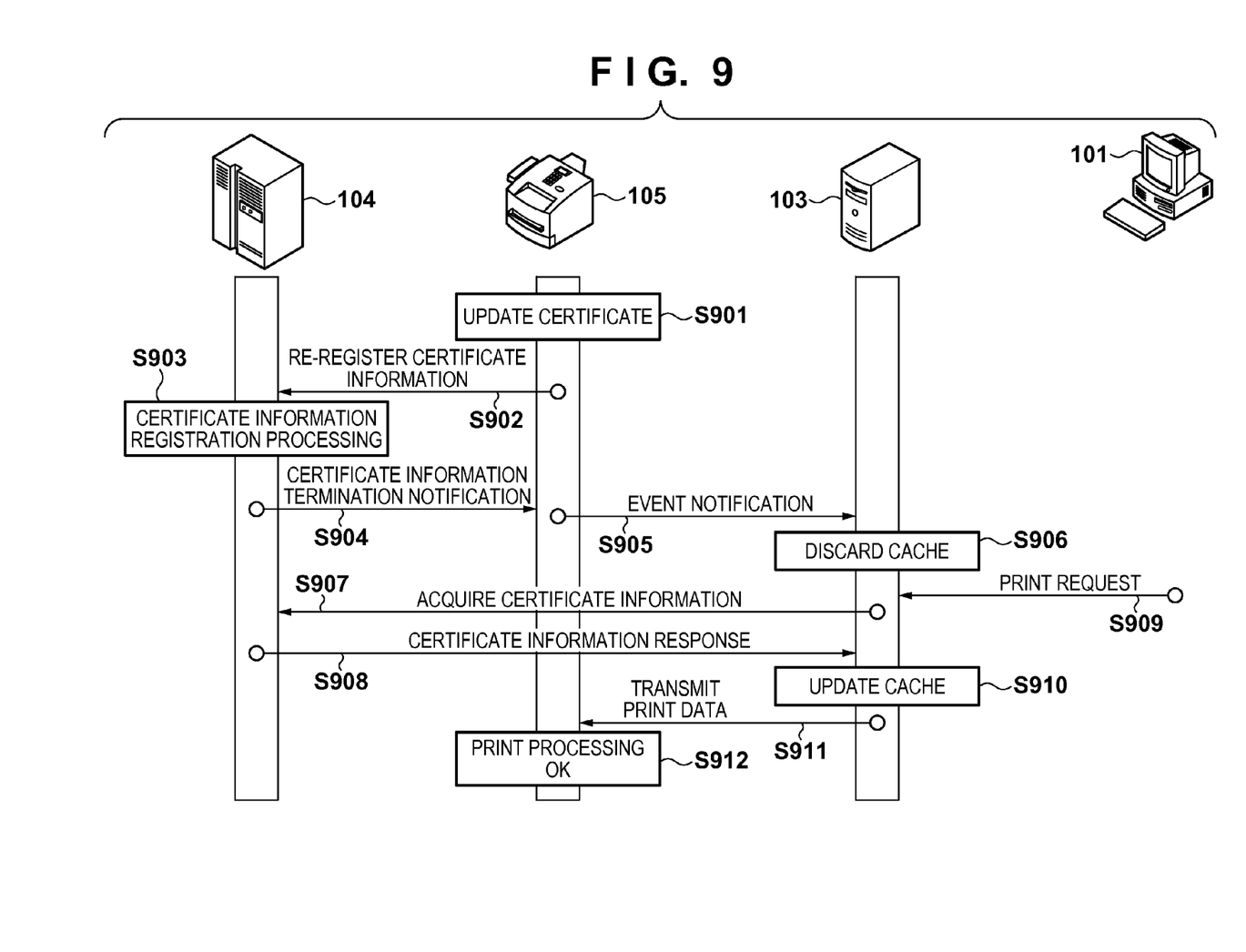
FIG. 9 is a flowchart of the network printing system according to the present invention.

Although the present embodiment was described for image forming apparatuses, there are examples of network environments in which the number of image forming apparatuses is more than one hundred. In such an environment in which there is a large number of devices, there tend to be lags between an event reception by the printer server 103 side and re-registration processing by the authentication server 104 side. In this situation, mistakes in updating the cached authentication information, as shown in FIG. 8, occur easily. FIG. 9 shows a flow of processing for controlling a network printing system that takes the above problem into consideration.

If a certificate of the image forming apparatus 105 is updated in step S901, the image forming apparatus 105 re-registers information of the certificate with the authentication server 104 in step S902. In step S903, the authentication server 104 performs processing for registering the certificate information, and sends a termination notification to the image forming apparatus 105 in step S904. After receiving the termination notification, in step S905, the image forming apparatus 105 further sends an event notification to the printer server 103, indicating that the certificate has been updated. Upon receiving the event notification, the printer server 103 updates the internal cache information (steps S906, S907, S908, and S910). Accordingly, the cache in the printer server 103 is guaranteed to be updated after the certificate registered in the authentication server 104 has been updated.

If receiving a print request is received between discarding the cache and updating the cache (step S909), the printer server 103 transmits print data in step S911 after finishing the update of the cache. Here, since there is no lag for in updating the certificate information, the TSL communication for print processing is performed without a problem, and a print operation is performed (step S912).

Flow for Controlling Image Forming Apparatus 105

Figure 10:
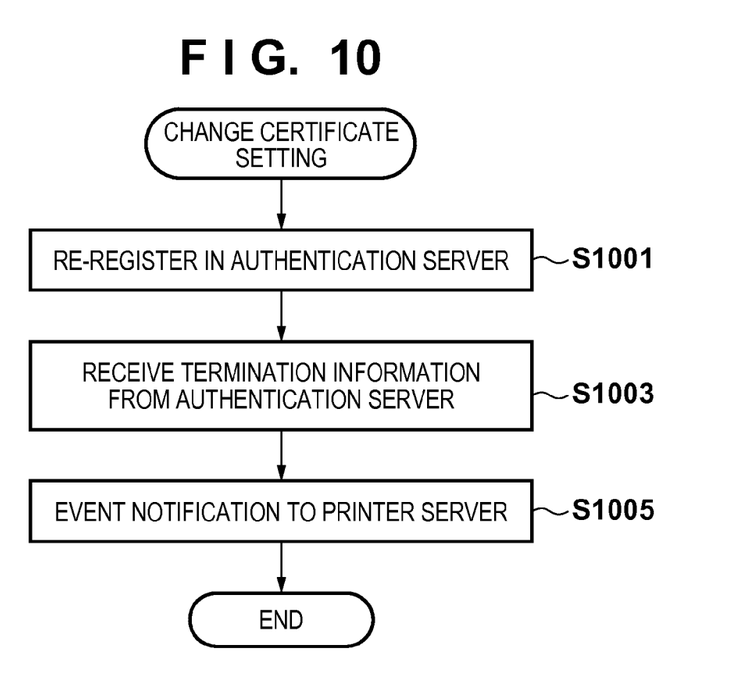
FIG. 10 is a flowchart of the image forming apparatus in the network printing system according to the present invention.

Next, FIG. 10 shows a flow for controlling the image forming apparatus 105 of the present invention after the certificate information has been updated. FIG. 10 shows a processing procedure for the case where a setting of the certificate was changed, in other words, for the case where the certificate information was updated. If an administrator updates the certificate information stored in the image forming apparatus 105 by a separate procedure, the processing in FIG. 10 is executed. In other words, when the procedure in FIG. 10 starts, the certificate information of the image forming apparatus 105 has already been updated. In step S1001, the image forming apparatus 105 re-registers the change in the certificate with the authentication server 104. Then, the image forming apparatus 105 waits for a termination notification from the authentication server 104. Upon receiving the termination notification (step S1003), in step S1005, the image forming apparatus 105 sends a notification of the certificate change event to the printer server 103. It should be noted that the procedure in FIG. 10 is based on FIG. 9. If the procedure were based on FIG. 8, step S1005 would be performed immediately after step S1001.

Flow for Controlling Printer Server 103

Figure 11:
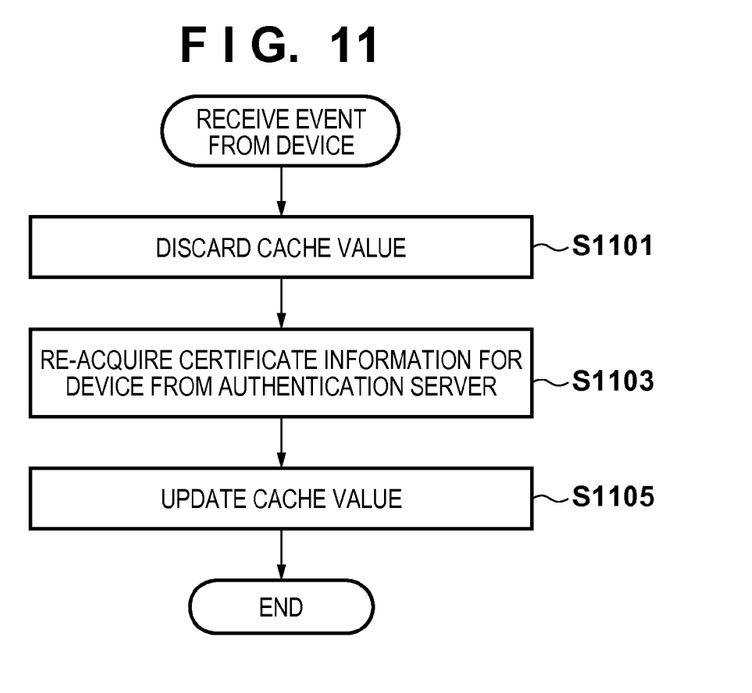
FIG. 11 is a flowchart of the printer server apparatus in the network printing system according to the present invention.

Next, in FIG. 11, a processing flow of the printer server 103 at the time of receiving a certificate change event is described. It should be noted that it is assumed that in the procedure of FIG. 11, certificate information has already been cached. A first caching is performed, for example, after connection to a network, or when certificate information is acquired first from the authentication server 104 in accordance with the TLS procedure. After receiving the certificate change event, the printer server 103 updates the cache information of the certificate information in the printer server. More specifically, the printer server 103 discards the cache information (step S1101), re-acquires the certificate information from the authentication server 104 (step S1103), and updates the cache information (step S1105). Then, the usual processing is continued using the new certificate information.

As described above, failure in authentication processing can be prevented by forcibly updating the cache. Also, by reducing time lags in the synchronization between the authentication server 104 and the cached certificate information even in network systems in which the number of connected devices is large and the amount of traffic is large, re-caching of the certificate information that has not been updated can be prevented by updating the cache after the update of the certificate information has been finished in the authentication server 104.

In the above description, regarding the update of certificates on the image forming apparatus 105, no particular examples for using the updated certificate were described. More specifically, examples include changing a certificate by a user or an administrator on an image forming apparatus, predicting an expiration of the certificate by a determination performed by the image forming apparatus 105, and the like. A change in the certificate may be performed for such reasons as rewriting the content of the certificate, performing maintenance of apparatuses (replacement of the certificate due to replacement of a hard disk or the like), and the like. In an image forming apparatus, it is possible to perform further control on a printer server side due to notification of the expiration of a certificate.

Second Embodiment

Figure 12:
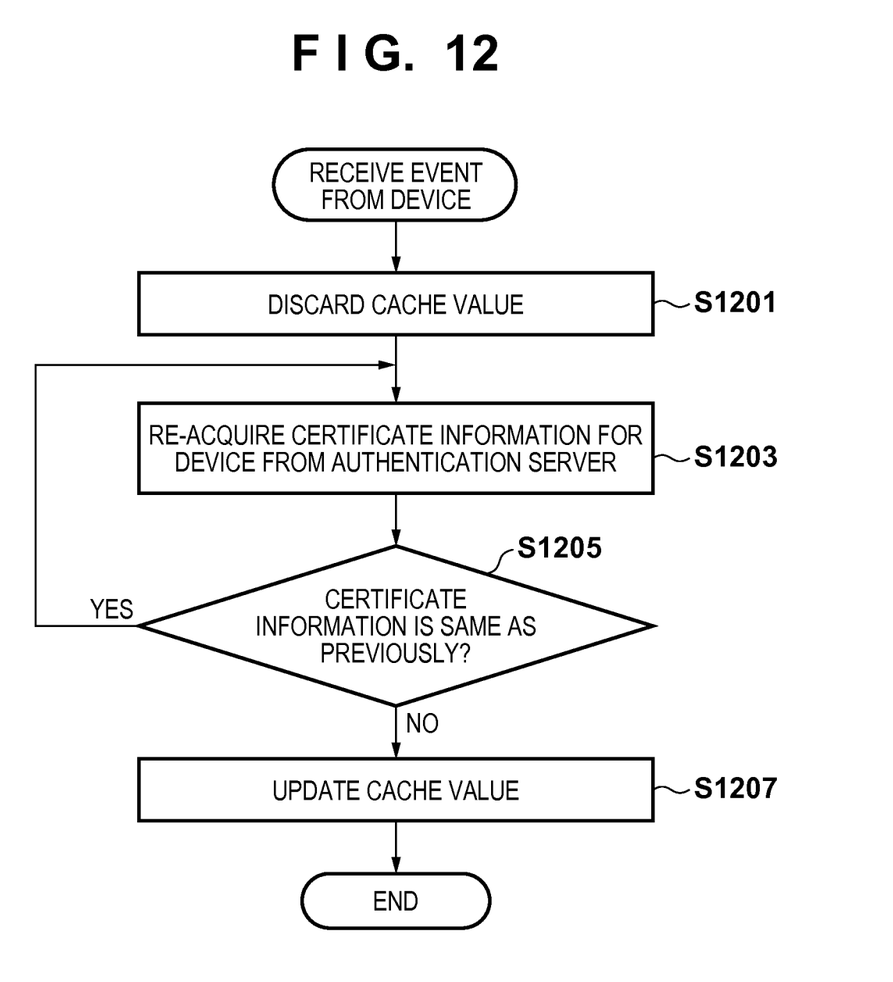
FIG. 12 is a flowchart of the printer server apparatus in the network printing system according to the present invention.

In the First Embodiment, the printer server 103 receives a certificate update event from the image forming apparatus 105, and updates the internal cache information (step S1105). In the present embodiment, if the same certificate information as the previous information is acquired from the authentication server, the acquisition from the authentication server side may be performed again after a certain interval. In the present embodiment, the procedure of FIG. 12 is executed instead of the procedure of FIG. 11. Using FIG. 12, the differences between FIG. 11 and FIG. 12 are described. In step S1201, the printer server 103 temporarily saves the cached certificate information, and then discards the cache. In step S1203, the printer server 103 acquires certificate information for the image forming apparatus 105 from the authentication server 104. Here, the printer server 103 checks (compares) the acquired certificate information with the saved certificate information that has been previously cached (step S1205), and if the acquired certificate information is the same as the previous certificate information, the procedure returns to step S1203, and then re-acquisition is further performed. It should be noted that although not shown in the drawings, the re-acquisition is performed after a certain time interval. In step S1205, if the acquired certificate information is different from the previous certificate information, the cache value of the certificate information in the printer server 103 is updated to that value (step S1207). At the same time, the printer server 103 disables the saved certificate information. It should be noted that if the cache is freely accessible, and the cache is not updated automatically by a reception of the certificate information, it is not necessary to perform step S1201. In this case, in step S1205, the received certificate information is compared with the certificate information in the cache. Also, if the cache is updated with the procedure of FIG. 12, it is possible to reliably cache the updated certificate information even in the case of the sequence in FIG. 8.

With the procedure described above, the cached certificate information can be reliably updated by the updated certificate information.

Third Embodiment

In Third Embodiment, the procedure for updating the cache is the same procedure as in FIG. 11 or 12. However, there are cases in which the update of the cache is performed along with not only an event for updating a certificate from the authentication server 104 but also expiration of the validity period of the cache. Thus, in the case where certificate information was cached, the time at which the certificate was cached is recorded in association with the cache, and the elapsed time is checked periodically and it is determined whether the cache has expired, and in the case where the cache has expired, the processing of FIG. 11 or 12 is started in this case. It should be noted that the determination of the elapsed time may be configured to be performed by, for example, activating a timer in which the validity period is set with the update of the cache, and the processing of FIG. 11 or 12 may be triggered by the expiration of the validity period. With this, it is possible to further reduce problems caused by lag in updating a certificate.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-195348, filed Sep. 7, 2011, which is hereby incorporated by reference herein in its entirety.

What is claimed is:

1. A secure network system configured by connecting an image forming apparatus, a printer server, and an authentication server,
   wherein the authentication server registers the certificate information acquired from the image forming apparatus in a storage, and in response to a request, transmits the registered certificate information to a device that has requested the certification information,
   the printer server authenticates the image forming apparatus by comparing certificate information of the image forming apparatus that is acquired from the authentication server with certificate information of the image forming apparatus that is acquired from the image forming apparatus,
   when the certificate information has been updated, the image forming apparatus sends a notification that the certificate information has been updated to the printer server after a registration of the updated certificate information in the authentication server has been finished, and
   the printer server further caches the acquired certificate information, and
   the printer server, when acquiring the certificate information from the authentication server in response to a notification that the certificate information has been updated, compares certificate information that has already been cached with the acquired certification information, and if the cached certificate information is different from the acquired certification information, caches the acquired certificate information, and if the cached certificate information matches the acquired certification information, re-acquires the certificate information from the authentication server.

2. The secure network system according to claim 1, wherein the printer server, when caching the certificate information, checks a validity period of the cache, and if the validity period expired, acquires the certificate information from the authentication server and re-caches the acquired certificate information.

3. A method for updating certificate information in a secure network system configured by connecting an image forming apparatus, a printer server, and an authentication server, the update method comprising the steps of:

registering, with the authentication server, the certificate information acquired from the image forming apparatus in a storage, and transmitting the registered certificate information in response to a request to a device that has requested the certificate information, authenticating, with the printer server, the image forming apparatus by comparing certificate information of the image forming apparatus that is acquired from the authentication server with certificate information of the image forming apparatus that is acquired from the image forming apparatus, when the certificate information is updated, sending, with the image forming apparatus, a notification that the certificate information has been updated to the printer server after a registration of the updated certificate information in the authentication server has been finished, and when acquiring the certificate information from the authentication server in response to a notification that the certificate information has been updated, comparing, with the printer server, certificate information that has already been cached with the acquired certification information, and if the cached certificate information is different from the acquired certification information, caching, with the printer server, the acquired certificate information, and if the cached certificate information matches the acquired certification information, re-acquiring, with the printer server, the certificate information from the authentication server by the printer server.

4. A secure network system configured by connecting an image forming apparatus, authentication server and a printer server, wherein the image forming apparatus is authenticated by the printer server comparing certificate information of the image forming apparatus that is acquired from the authentication server with certificate information of the image forming apparatus that is acquired from the image forming apparatus, and acquired certificate information from the authentication server is cached in the printer server, and the image forming apparatus comprises:

a registration unit which re-registers, when the certificate information has been updated, certificate information in the authentication server; and a notification unit which send a notification causing the printer server to discard cached certificate information, in response to a notification that the registration of the certificate information acquired from the authentication server has been terminated, wherein the printer server caches the acquired certificate information, and the printer server, when acquiring the certificate information from the authentication server in response to a notification that the certificate information has been updated, compares certificate information that has already been cached with the acquired certification information, and if the cached certificate information is different from the acquired certification information, caches the acquired certificate information, and if the cached certificate information matches the acquired certification information, re-acquires the certificate information from the authentication server.

5. A secure network system configured by connecting an image forming apparatus, an authentication server and a printer server, the image forming apparatus comprising:

a transmission unit which transmits certificate information to be registered in the authentication server to the authentication server, and transmitting certificate information to the printer server in response to a request from the printer server;

a unit which performs, when the certificate information has been updated, a notification that the certificate information has been updated to the printer server after a registration of the updated certificate information in the authentication server has been finished; and an execution unit which executes printing of transmitted print data by the printer server comparing certificate information of the image forming apparatus that is acquired from the authentication server with certificate information of the image forming apparatus that is acquired from the image forming apparatus, and authenticating the image forming apparatus, wherein the printer server caches the acquired certificate information, and the printer server, when acquiring the certificate information from the authentication server in response to a notification that the certificate information has been updated, compares certificate information that has already been cached with the acquired certification information, and if the cached certificate information is different from the acquired certification information, caches the acquired certificate information, and if the cached certificate information matches the acquired certification information, re-acquires the certificate information from the authentication server.

* * * * *